Figure 2:
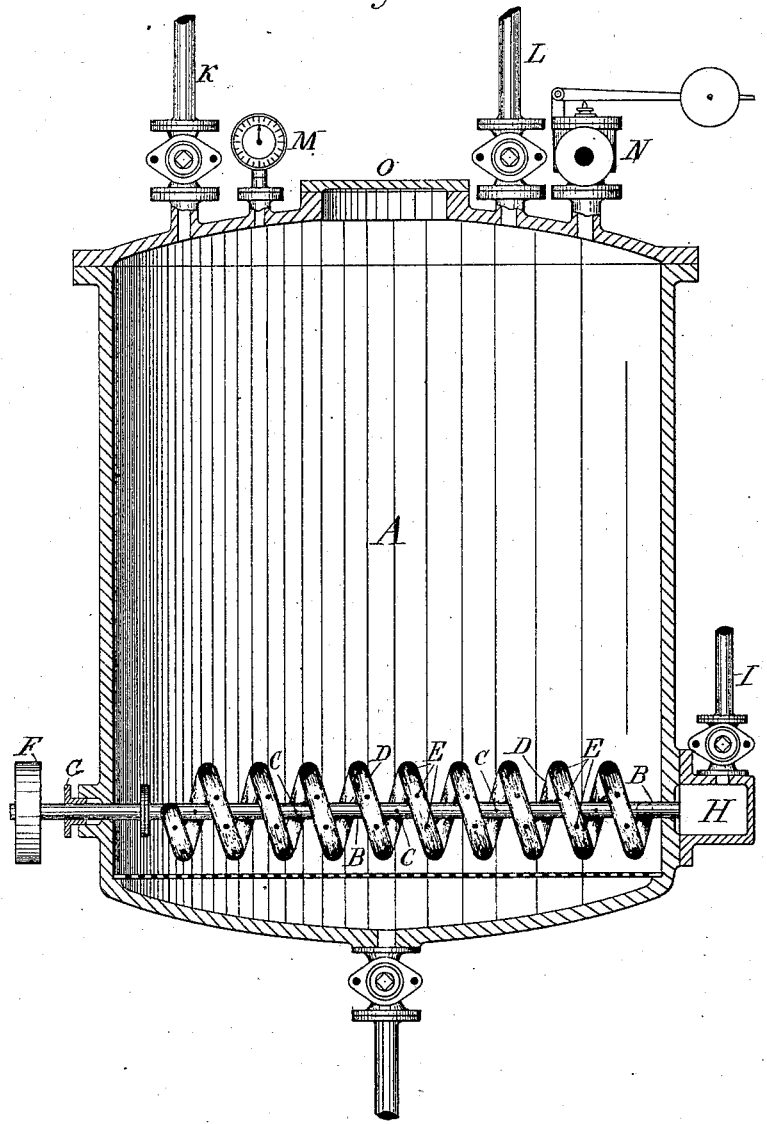

(No Model.) 2 Sheets—Sheet 1.
J. H. S. WILDSMITH.
TREATMENT OF STARCH YIELDING MATERIALS AND APPARATUS THEREFOR.
No. 307,366. Patented Oct. 28, 1884.
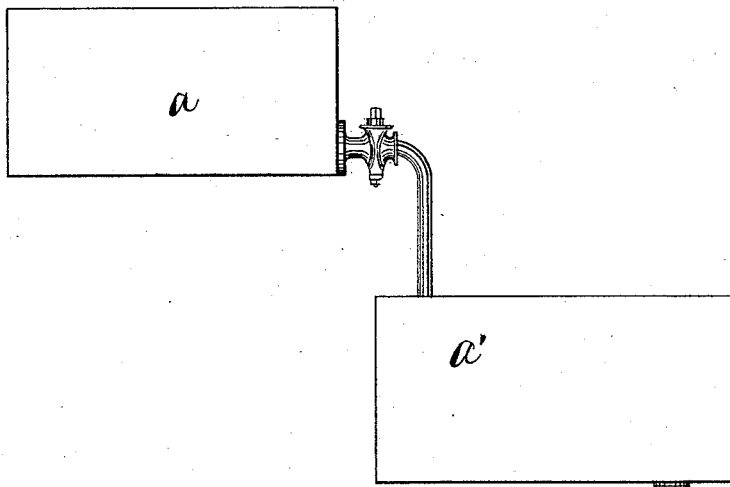
Fig. 1.
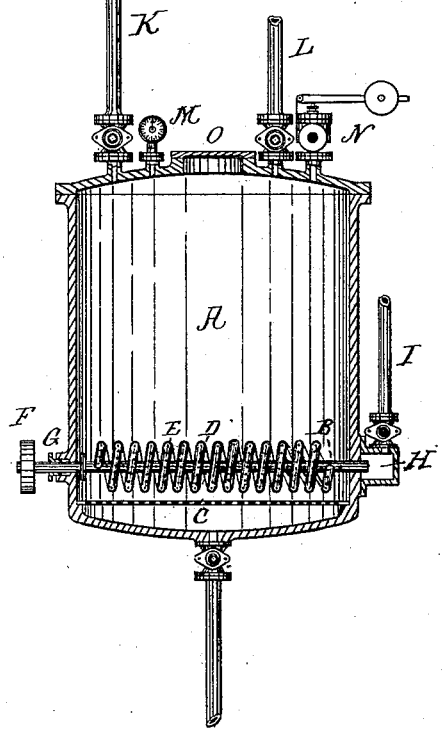
Witnesses:
Edward E. Ellis
G. M. Meyer
Inventor:
J. H. S. Wildsmith
By O. E. Duff
Atty.

(No Model.) 2 Sheets—Sheet 2.

J. H. S. WILDSMITH.

TREATMENT OF STARCH YIELDING MATERIALS AND APPARATUS THEREFOR.

No. 307,366. Patented Oct. 28, 1884.

Witnesses
Edward E. Ellis
A. Leo Duffy

Inventor
James Henry Staples Wildsmith
per O. E. Duffy
Atty

United States Patent Office.

JAMES HENRY STAPLES WILDSMITH, OF LONDON, ENGLAND.

TREATMENT OF STARCH-YIELDING MATERIALS AND APPARATUS THEREFOR.

SPECIFICATION forming part of Letters Patent No. 307,366, dated October 28, 1884.

Application filed March 7, 1884. (No model.) Patented in England August 28, 1883, No. 4,146.

*To all whom it may concern:*

Be it known that I, JAMES HENRY STAPLES WILDSMITH, a subject of the Queen of England, residing at London, England, have invented new and useful Improvements in the Treatment of Starch-Yielding Materials and in Apparatus therefor, of which the following is a specification.

My invention has for its object a more simple and effective method of disintegration of starch-yielding materials—such as potatoes, maize, rice, and other grain—for the preparation of "brewing-meal" with or without conversion into glucose, and convertible into starch and dextrine or either of them more readily than by the ordinary method of treatment.

In the drawings, Figure 1 represents a view of my apparatus, showing the same partly in side elevation and partly in vertical section, and Fig. 2 represents an enlarged vertical sectional view of the digesting tank or vessel.

I take any given quantity of the starch-containing substance and place the whole of it in a vat large enough to rather more than contain the whole of it, provided with a cover and of any suitable shape, but preferably rectangular, and having a draw-off cock or equivalent at the bottom protected by a fine grating or perforated false bottom to prevent loss of the material. This I term the "macerating-vat," and its construction will be well understood. Having closed the vat tight, I run onto the substance placed in it a saturated solution of two-thirds (⅔) of calcic oxide and one-third (⅓) water, or the one-third portion of water may be omitted altogether or modified, and allow the contents of the vat to macerate for thirty-six to forty-eight hours, more or less, at the end of which time I open the tap at the bottom, and allow the solution with the dissolved fusel or grain oil and other matters to drain off. I next run a quantity of water (adding, if desirable, an alkali or alkaline earth in solution at the rate of two to two and one-half per cent.) on the top and over the whole charge, so as to aid the more complete removal of and dissolve out these soluble matters. I then wash with water again, allow to drain, and then cover the whole with water containing a small quantity of neutral sulphite of soda—say two to three per cent.—letting the same stand for several hours, and I then add an equivalent proportion of sulphuric or other mineral acid to decompose the salt used and liberate the sulphurous acid in combination, and act on the starchy matter in the nascent state so as to bleach it and complete its purification. Other acids may be used for this purpose, but I prefer the above on account of the bleaching effects. The whole mass is lastly treated with water only, and allowed to drain as much as it will, and is then removed from the vat onto a floor which has been covered with thick felt, where it remains for another forty-eight hours or so. At this point the rice or other grain will have been rendered so porous and soft as to readily absorb sufficient dilute acid for its conversion into glucose, or be easily crushed or ground to a pulp for the liberation of the starch.

For the conversion into glucose I simply take the macerated grain, as above set forth, somewhat drained and dried, and treat it with a solution of acid, either sulphuric or hydrochloric, but by preference sulphuric, especially when a pure article is required, well mix, and allow the whole to rest until the grain has absorbed sufficient acid to insure its conversion into glucose or dextro-maltose, determining this by the object required, and in the manner hereinafter described. I however prefer, first, to convert the macerated grain into what I term "green starch," before treating with dilute acid and before conversion, as hereinafter set forth, as yielding the best and purest glucose or dextro-maltose. Diastase may also be used in place of the dilute acid; but for the most complete conversion the diastase must be supplemented by the additional treatment of dilute sulphuric acid. If diastase be used, I find a temperature of 130° to 140° Fahrenheit for about the first two hours preferable, which may be afterward raised to the usual temperature of 158° Fahrenheit.

The converter A is shown in the drawings, and is preferably cylindrical, with a hollow shaft or tube, B, passing through it, and perforated with holes C, which may be, say, one-eighth of an inch in diameter, and spaced at convenient distances apart.

Round the hollow shaft B is coiled a worm, D, also hollow and perforated with holes E, but spaced much closer together, so constructed as to be capable of being revolved—say by means of the pulley F—at a suitable speed—generally seven to nine revolutions per minute. A stuffing-box, G, makes a tight joint with the converter, and the open end of the shaft B passes through the converter into the steam box or case H, which is supplied with steam by the pipe I, the steam entering the open end of the tube B, filling both that and the worm, and escaping into the converter by the holes C and E. The precise form of the worm can of course be varied, if desired. For instance, it could be cast in one hollow piece and the worm might become a complete screw-thread in one piece with the shaft. However, I find the form above described to give very satisfactory results. The worm is located as near the bottom of the converter as possible, and its function is to supply steam to the charge in the converter, and mix the steam in with the charge, so that the whole may be equally and thoroughly saturated. The converter is also provided with the pipe K to admit the acid, and the pipe L to admit the charge, both these being provided with stop-cocks. There is also a pressure-gage, M, safety-valve N, and man-hole O, and all usual accessories. This arrangement is much more effectual and rapid in action than any other known to me, and yields a product much superior and less colored, especially when the material operated upon is in the state of green starch, and leaves but slight débris in the glucose except that added for neutralizing the acid and for the purification of sirup, thus saving much time and cost in the manufacture. A smaller vessel also than usual can be employed for the converter, as my process may be made almost a continuous one on account of the very short time—generally only about five or six minutes—occupied in charging a charge when the grain is used in the solid porous state above described.

In order to make the process as continuous as possible, I use a boiling-vat, $a$, rather above the level of the converter, in which the preliminary mixing with boiling acid and water is carried on and prepared for running into the high pressure first named. I employ a second vat, $a'$, placed at a lower level than the converter, in which any requisite further boiling and neutralization may be effected during the time that a fresh charge is being placed in the converter.

The completion of the process may be tested in the usual way with solution of iodine and alcohol of 90°, the first for free starch, and the latter for dextrine. When the process is found to be complete, I neutralize with fine carbonate of lime or carbonate of barytes, using therewith a little animal charcoal, say, about fifty-six pounds to two tons of grain. About twenty pounds of this quantity is first converted into monophosphate of lime and added to the sirup before using the carbonate of lime, and when nearly neutralized the remainder of animal charcoal is added and the whole boiled for a few minutes and neutralization completed. The whole solution may then be run off into a subsiding-tank and there allowed to settle for about six or eight hours, and the precipitate wash drained and filtered. The liquid is perfectly bright and of a specific gravity of 15° to 20° Baumé, and is now concentrated to 28° to 30° Baumé, again filtered or pressed to remove any remaining sulphate of lime, and finished *in vacuo* to 35° or 40° Baumé, as may be required, or may be at once diluted and used for brewing beer, vinegar, and spirits. In the third place I grind or crush the macerated material under a stream of water, after the manner of starch-making, and separate the husky matters and broken cellular tissue by means of a sieve, through which the starch and water pass and are collected in a tank placed at a lower level, (so fixed as to receive the whole as it runs through the sieve,) and therein allowed to settle. The water being siphoned and run off, the starch is further washed, if desired, a second time. The result I term "green starch," which may be used, as above stated, for the production of glucose, dextro-maltose, capillaire-sirup, grape-sugar, and starch or dextrine; or, in the fourth place, the grain after maceration, as above described, for the removal of the fusel-oil and nitrogenous matters may be dried and then ground to meal, and will in this state be found by my process to form the best brewing-meal devoid of noxious matter, more easily and completely acted on by the diastase of the malt used, and producing a fuller and more palatable beer than can be obtained by any ordinary method.

Having now described my invention, I claim—

1. The process, substantially as herein described, of preparing starchy substances for brewing purposes, the same consisting in treating such substances with a solution of calcic oxide or lime-water, and drawing off the said solution with the impurities taken up thereby, then adding an alkali to remove soluble matters, and afterward washing with water, then treating with solution of neutral sulphate of soda, then adding a solution of sulphuric acid to neutralize and precipitate the lime, and finally washing to remove all substances from the starchy matter, and drying such matter for use, substantially as specified.

2. The combination of the vessels $a$ $a'$, converter A, having pipes K L, steam-case H, having pipe I, the perforated hollow rotating shaft extending from the steam-case into the converter, and the hollow perforated pipe surrounding the hollow shaft, and connected with it, the whole arranged to operate substantially in the manner and for the purpose specified.

In testimony whereof I have hereto set my hand in the presence of two subscribing witnesses.

JAMES HENRY STAPLES WILDSMITH.

Witnesses:
ALFRED J. BOULT,
BERNHARD DULCES.